United States Patent [19]
Flamm et al.

[11] Patent Number: 5,576,534
[45] Date of Patent: Nov. 19, 1996

[54] ERROR REDUCTION BY QUASI NON-MULTIPLEXED SIGNAL PROCESSING IN A MULTIPLEXED FIBER OPTIC ROTATION SENSOR LOOP

[75] Inventors: Juergen K. P. Flamm, Tarzana; Daniel A. Tazartes, West Hills, both of Calif.

[73] Assignee: Litton Systems, Inc., Woodland Hills, Calif.

[21] Appl. No.: 282,754

[22] Filed: Jul. 29, 1994

[51] Int. Cl.$^6$ .............................. G01B 9/02; G01C 19/72
[52] U.S. Cl. .................................. 250/227.19; 356/350
[58] Field of Search ......................... 250/227.19, 227.14, 250/227.27, 227.28; 356/363, 359, 358, 357, 356, 355, 350, 349, 345; 385/12, 14

[56] References Cited

U.S. PATENT DOCUMENTS

| | | | |
|---|---|---|---|
| 4,591,269 | 5/1986 | Mohr | 356/350 |
| 5,033,854 | 7/1991 | Matthews et al. | 356/350 |
| 5,137,359 | 8/1992 | Steele | 356/350 |
| 5,189,488 | 2/1993 | Mark et al. | 356/350 |
| 5,268,740 | 12/1993 | Gröllmann | 356/350 |
| 5,325,173 | 6/1994 | Tazartes et al. | 356/350 |
| 5,331,401 | 7/1994 | Mark et al. | 356/350 |
| 5,337,143 | 8/1994 | Mark et al. | 356/350 |
| 5,347,359 | 9/1994 | Hutchings et al. | 356/350 |
| 5,351,123 | 9/1994 | Spahlinger | 356/350 |

*Primary Examiner*—Edward P. Westin
*Assistant Examiner*—John R. Lee
*Attorney, Agent, or Firm*—John H. Lynn; Poms, Smith, Lande & Rose

[57] ABSTRACT

A digital controller produces control data signals for application to each of three fiber optic rotation sensors in a triaxial rotation sensing system. The digital controller also produces strobe signals corresponding to each fiber optic rotation sensor. The digital controller sequentially provides first, second and third strobe signals that activate the analog converters sequentially to apply modulating signals to the three fiber optic rotation sensors. The system further includes apparatus for providing modulation cycles to keep all three fiber optic rotation sensors active simultaneously. Sampling apparatus samples each sensor sequentially during a τ period and feedback modulation control data signals are applied sequentially to the three sensors during the τ period for each sensor when the sensor was sampled. Feedback modulation control data signals are isolated from each fiber optic rotation sensor except for the τ periods in which it is sampled.

8 Claims, 4 Drawing Sheets

ERROR REDUCTION BY QUASI NON-MULTIPLEXED SIGNAL PROCESSING IN A MULTIPLEXED FIBER OPTIC ROTATION SENSOR LOOP

BACKGROUND OF THE INVENTION

This invention relates generally to signal processing circuitry for fiber optic rotation sensors. In particular this invention relates to apparatus and methods for using quasi non-multiplexed signal processing in a multiplexed fiber optic rotation sensor.

A fiber optic rotation sensor uses the Sagnac effect in a coil of optical fiber to detect rotations about a sensing axis that is perpendicular to the plane of the coil. Counterpropagating light waves in the sensing coil experience a phase shift that is related to the rotation rate. The phase shift in each wave is dependent upon the direction of propagation of the waves relative to the direction of rotation. The phase shift is seen as a change in the interference pattern formed when the waves are combined. The interference pattern is produced when two waves of the same polarization have traversed the fiber optic sensing coil in opposite directions and then interfere. The interference pattern may be monitored by directing it onto a photodetector, which produces an electrical signal indicative of the intensity of the light in the interference fringe pattern.

The time required for the light to travel through the spool is called τ time. The output light intensity (sensor output) is a function of the phase shift between the clockwise and counterclockwise traveling light. A fiber optic rotation sensor typically will include a phase modulator that is used to shift the phase of the counterpropagating waves to adjust the output signal. The total phase shift between the counterpropagating waves is generated by rotation of the coil, feedback compensation in closed loop operation, and modulation applied to the waves. Feedback and modulation are electronically generated and applied to the phase modulator.

The sensor output signal level has a cosine characteristic as a function of optical phase shift. The cosine is a slowly changing function when its argument is near zero. Hence, the absolute signal level has little sensitivity around zero phase shift. To overcome this problem phase modulation is required. Square wave modulation of $n\pi/2$ (n=1 or –1 or 3 or –3) will achieve operating points at half of the maximum sensor output with maximum sensitivity on the cosine characteristic (maximum slope). Modulation should be reapplied synchronously after every elapsed τ time interval to prevent the sensor output from going to maximum and the sensitivity from going to zero.

Some fiber optic rotation sensors are not modulated and not sampled every τ time. Instead, modulation is applied and the sensor output is sampled only every three τ times. This modulation and sampling scheme allows time for multiplexing electronics required for three fiber optic rotation sensors in a triad system to measure rotations about three mutually perpendicular axes. Multiplexing is used to save costs that would be incurred in forming three essentially identical systems. There have been difficulties in modulating the one sensor without causing undesirable modulation of one or more of the other two sensors.

SUMMARY OF THE INVENTION

This invention provides techniques for overcoming difficulties encountered in previous triaxial fiber optic rotation sensor systems with modulating the phase of optical signals in one sensor without causing undesirable effects on the other sensors in the system.

Apparatus according to the present invention for modulating the phase of a triaxial fiber optic rotation sensor that includes three fiber optic rotation sensors arranged to sense rotations about three mutual perpendicular axes, comprises a digital controller apparatus arranged to produce control data signals to be applied to each of the three fiber optic rotation sensors and to produce strobe signals corresponding to each fiber optic rotation sensor. Digital to analog converters are connected to corresponding fiber optic rotation sensors so that each of the digital to analog converters is connected to the digital controller to receive the control data signals. The digital controller sequentially provides first, second and third strobe signals that activate the analog converters sequentially to apply modulating signals to the three fiber optic rotation sensors.

The apparatus according to the present invention may further include signal combining apparatus connected to receive sensor signals output from the three fiber optic rotation sensors and an analog to digital converter connected between the signal combining apparatus and the digital controller to sequentially input signals output from the three fiber optic rotation sensors to the digital controller.

The apparatus according to the present invention for modulating the phase of a triaxial fiber optic rotation sensor that includes three fiber optic rotation sensors arranged to sense rotations about three mutual perpendicular axes may also comprise signal combining apparatus connected to receive sensor signals output from the three fiber optic rotation sensors and an analog to digital converter connected between the signal combining apparatus and the digital controller to sequentially input signals output from the three fiber optic rotation sensors to the digital controller. The present invention may further include apparatus for providing modulation cycles to keep all three fiber optic rotation sensors active simultaneously. Sampling apparatus samples each sensor sequentially during a τ period and feedback modulation control data signals are applied sequentially to the three sensors during the τ period for each sensor when the sensor was sampled. Feedback modulation control data signals are isolated from each fiber optic rotation sensor except for the τ periods in which it is sampled.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
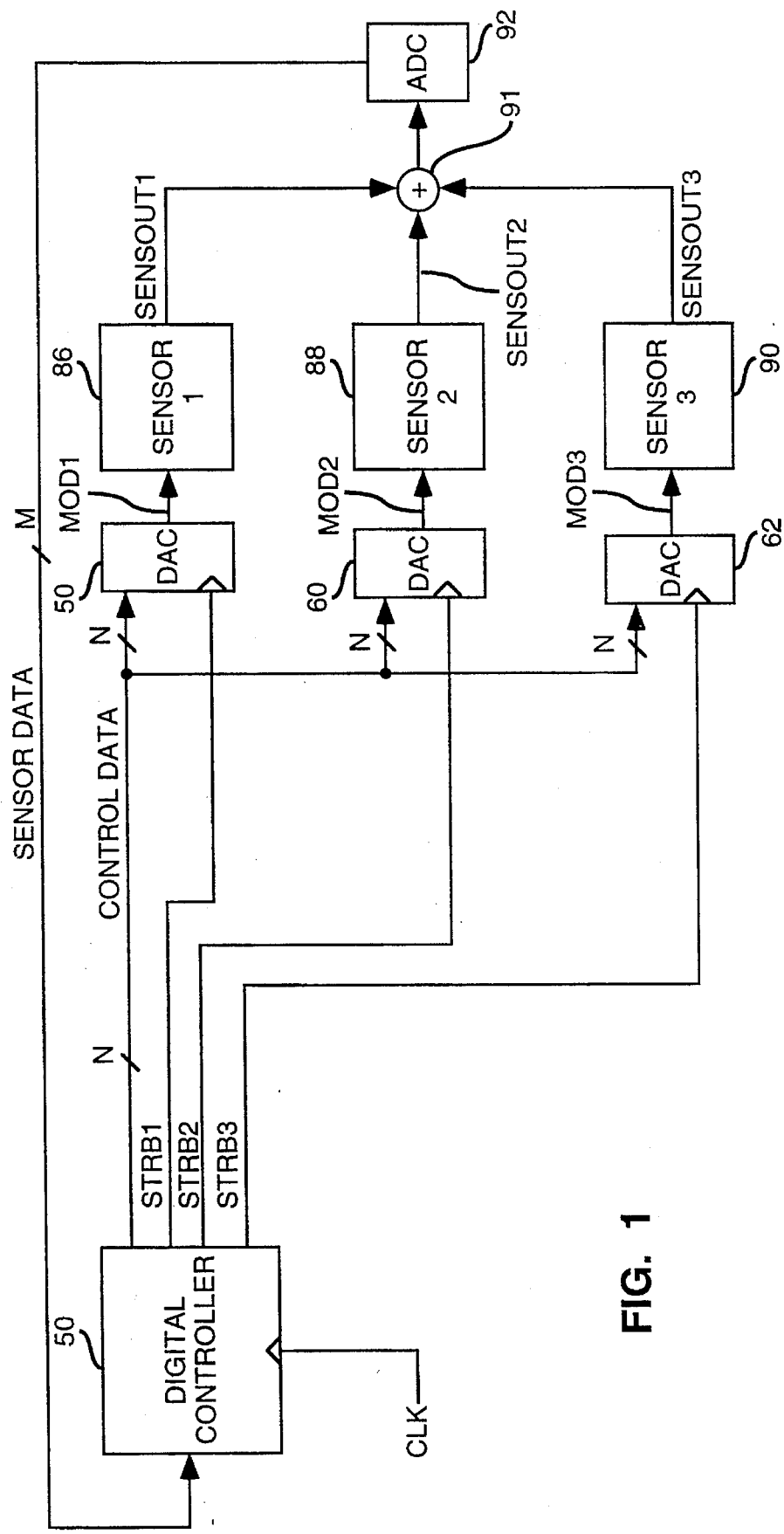
FIG. 1 schematically illustrates a first circuit for implementing the modulating scheme of FIG. 2.
Figure 2:
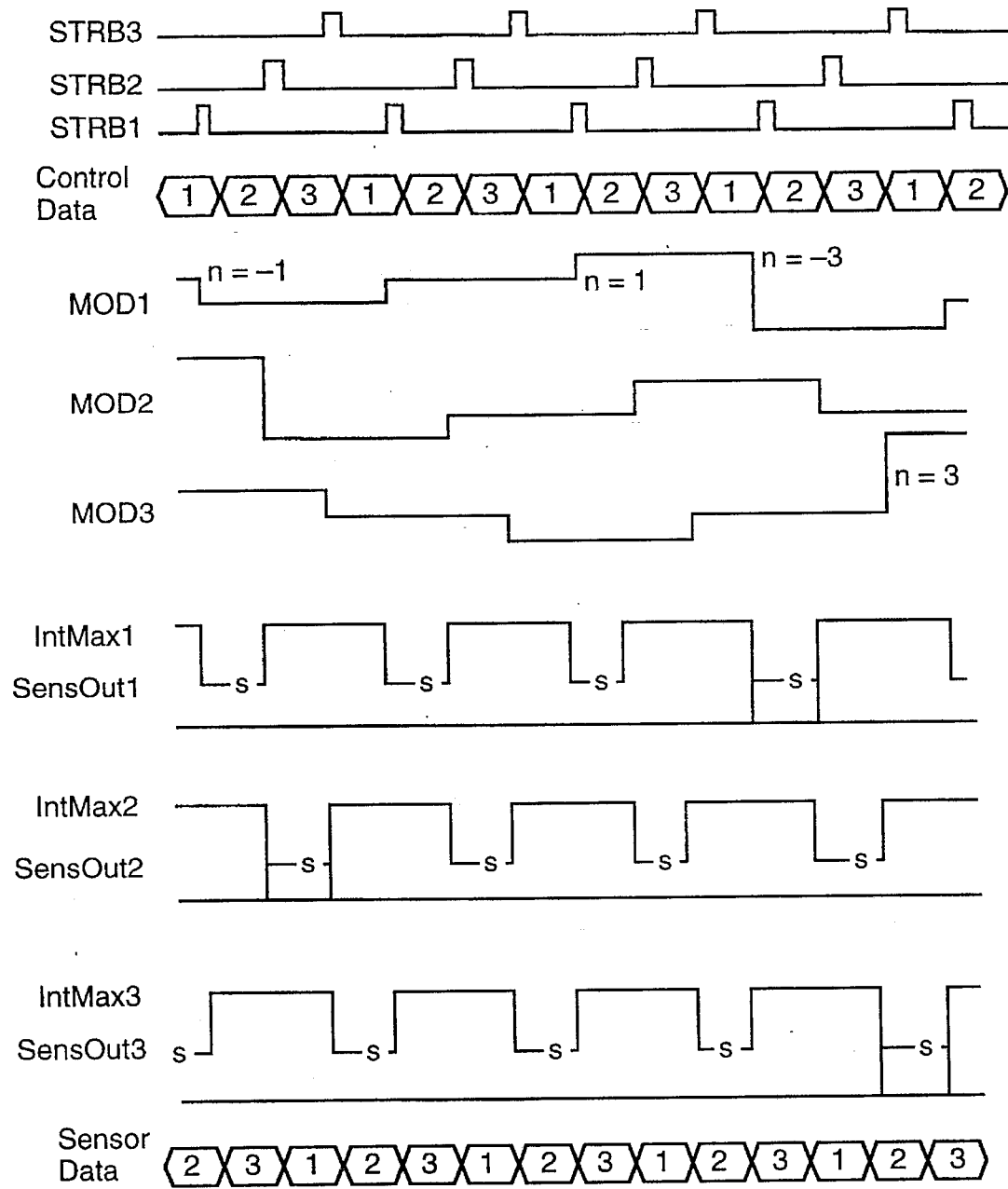
FIG. 2 graphically illustrates a first multiplexed modulation scheme.

Referring to FIGS. 1 and 2, there is shown a multiplexed modulation scheme that has been used in triad fiber optic rotation sensor systems.

The circuit of FIG. 1 includes a digital controller 50 arranged to control modulation of three fiber optic rotation sensors 86, 88 and 90. The digital controller 50 provides N data bits of control data and strobe signals STRB1, STRB2 and STRB3 to the digital to analog converters 58, 60 and 62, respectively. The digital controller 50 also provides the control data signal to the digital to analog converters 58, 60 and 62 sequentially in response to the strobe signals.

This modulation and sampling scheme allows time for multiplexing electronics required for the three fiber optic rotation sensors 86, 88 and 90 in a triad system to measure rotations about three mutually perpendicular axes. The scheme is illustrated in an example of arbitrarily applied modulation sequences and resulting sensor outputs given in FIG. 2. The output sampling points are indicated by an "s".

In response to the modulation signals, the sensors produce the output signals SENSOUT1, SENSOUT 2 AND SENSOUT 3. The output of each sensor 86, 88 and 90 as a function of time, modulation, input rotation and feedback is given by the following equation:

$$SensOut(t)=(IntMax)=(IntMax)(15)(1+\cos\{Mod(t)-Mod(t-\tau)+ROT(t)-(FB(t)-FB(t-\tau))\})$$

where:

t is the time;

SensOut(t) is the sensor output as a function of time;

IntMax is the maximum sensor output;

MOD(t) is the new modulation as a function of time;

MOD(t-τ) is the previous modulation (one τ old)

ROT(t) is the phase shift of input rotation;

FB(t) is the new phase shift of feed back; and

FB(t-τ) is the previous phase shift of feedback. MOD and FB are time-discrete signals, and ROT is time continuous. The purpose of the feed back loop is to establish $$ROT(t)-(FB(t)-FB(t-\tau))=0 \qquad (2)$$

such that FB(t) measures the input rotation angle and FB(t)−FB(t−τ) measures the change in angle over the time interval (t−τ) to (t) which gives the average rate over (t−τ) to (t).

Each of the three fiber optic rotation sensor 86, 88 and 90 is activated (modulated) and its output sampled for one τ time and left inactive for the following two τ times. The other two sensors are sequentially activated and sampled.

Although the scheme described above works perfectly in theory, the imperfections of the electronics and optical components are apparent when the scheme is implemented. The large changes in the sensor internal light level and in the sensor output signal level between modulated and non modulated states causes coupling between the three sensors. Coupling may occur in the electronics, the optics, or in both and may intolerably degrade performance of the sensors.

The long term settling behavior of the phase modulator output over three τ time periods creates sensor instability and repeatability problems. The settling behavior of the phase modulator output is primarily a function of temperature variations induced by output signal and load current changes. Generally a time of more than 1 micro second in this sense is long term.

Figure 3:
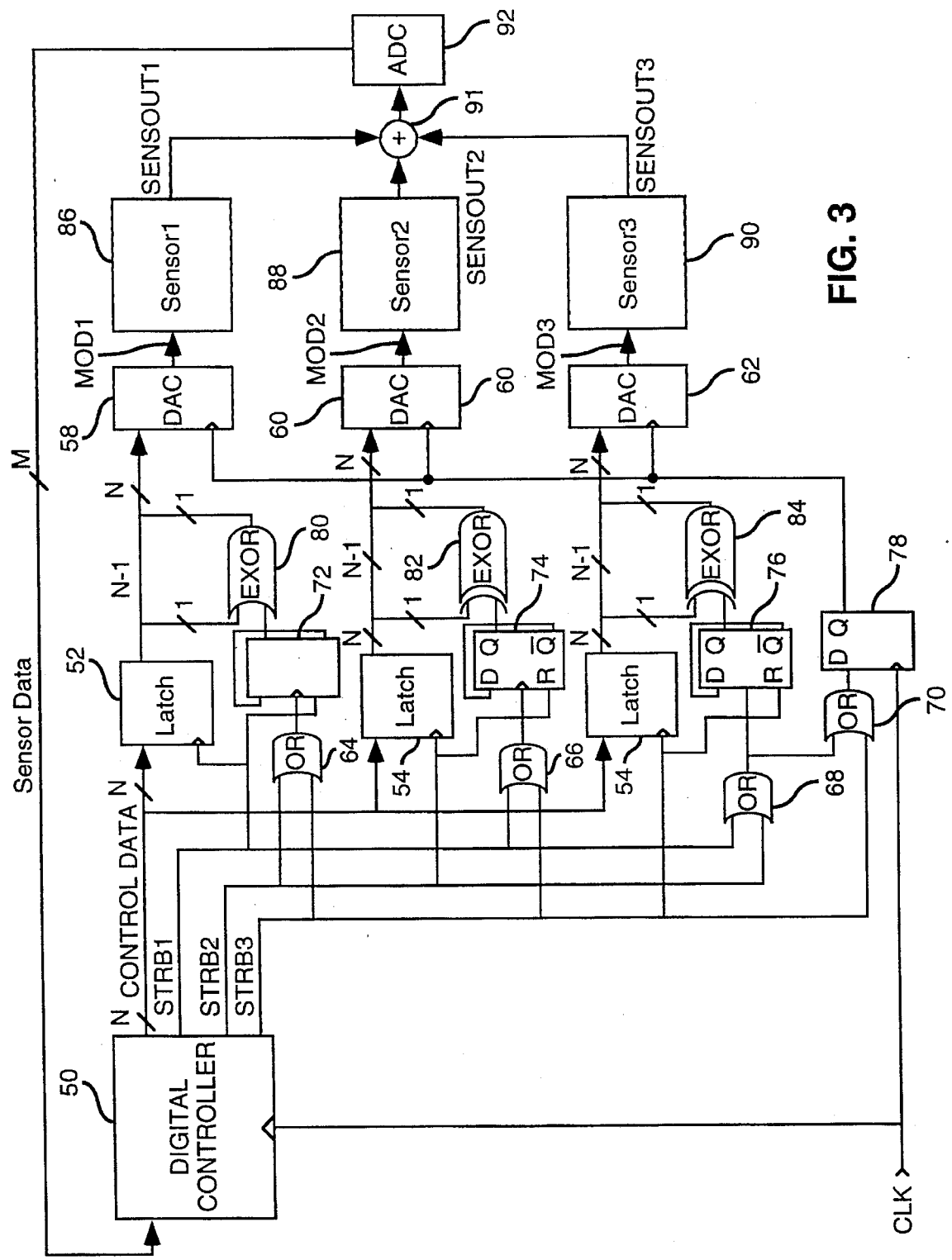
FIG. 3 schematically illustrates circuitry for implementing the modulation scheme of FIG. 4.
Figure 4:
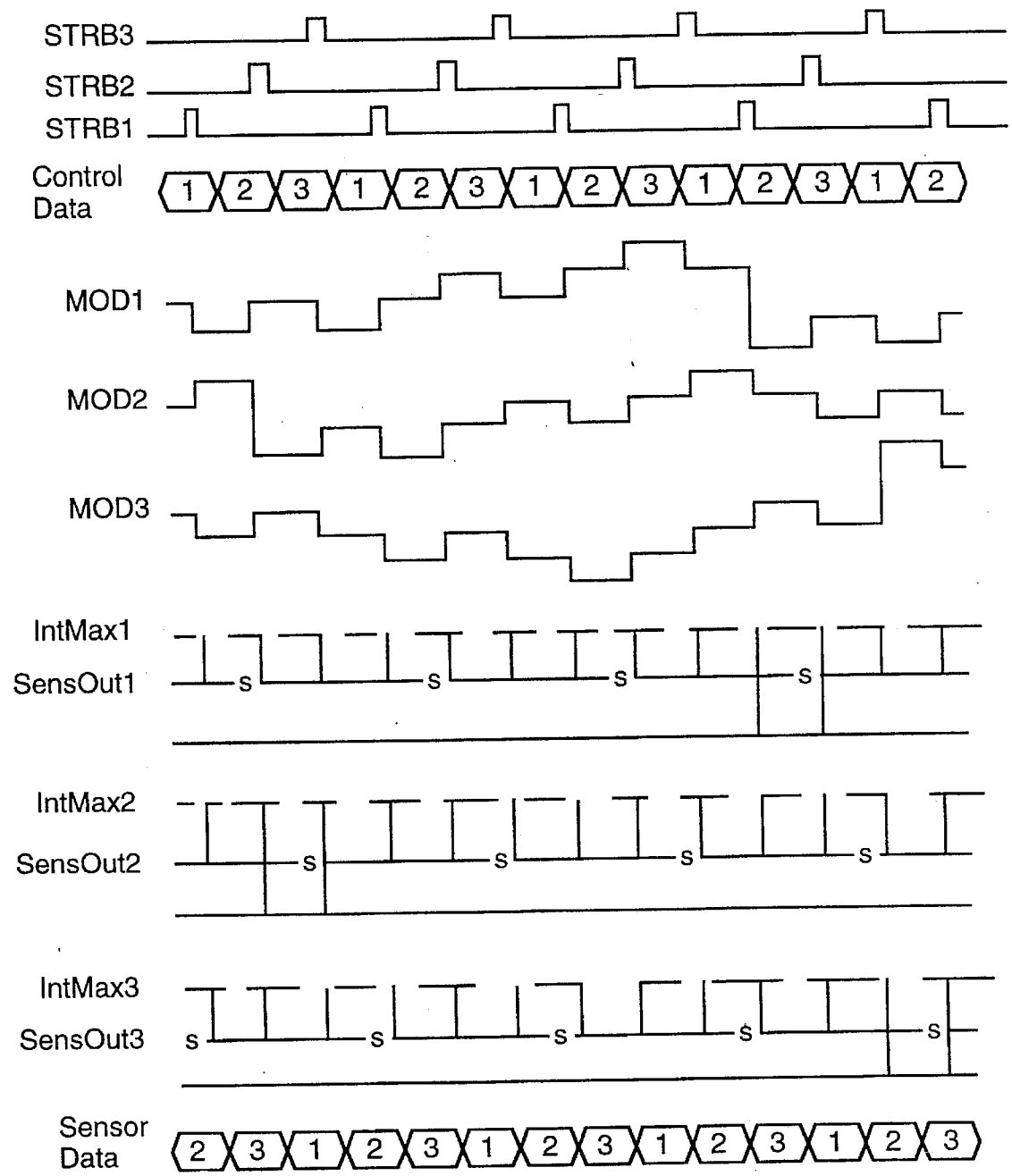
FIG. 4 graphically illustrates a second multiplexed modulation scheme.

Referring to FIGS. 3 and 4, there is shown a modified modulation scheme according to the present invention. The modulation scheme of FIGS. 3 and 4 helps minimize the performance-limiting effects caused by deficiencies of components that are presently available.

Referring to FIG. 3, the digital controller 50 again provides the CONTROL DATA, STRB1, STRB1 and STRB3 signal outputs. The CONTROL DATA signal is applied to three latches 52, 54 and 56 that correspond to the sensors 86, 88 and 90, respectively. The STRB1 signal is applied to the latch 54 and to the reset terminal of a flip flop 72. An exclusive OR gate 80 receives signals from both the latch 52 and the flip flop 72. The output of the latch 52 and the exclusive OR gate 80 are connected together and then connected to a digital to analog converter 58. The digital to analog converter 58 also receives clock signals from a flip flop 78. The system clock is connected to the digital controller 50 and to the flip flop 78.

The signal STRB1 is also connected to inputs of a pair of OR gates 60 and 68. The signal STRB2 is connected to a pair of OR gates 64 and 68. The OR gate 64 also receives the signal STRB3. The output of the OR gate 64 is connected to the flip flop 72 to disable it when the output of the OR gate 64 is high. Therefore, the STRB1 signal is not applied to the sensor 86 when either STRB2 or STRB3 is high. The output signal MOD 1 of the digital to analog converter 58 is input to the sensor 86.

The signal STRB2 is connected to the latch 54 and to a flip flop 74. The flip flop 74 is connected to an OR gate 66, which also is connected to the digital controller 50 to receive the STRB3 signal. The output of the flip flop 74 is input to an exclusive OR gate 82. The output of the exclusive OR gate 82 and the latch 54 are connected together and then connected to a digital to analog converter 60. The digital to analog converter 60 is also connected to the flip flop 78 to receive the clock signal. The output signal MOD2 of the digital to analog converter 60 is input to the sensor 88.

The signals STRB1 and STRB2 are connected to an OR gate 68. The output of the OR gate 68 is input to a flip flop 76, which also receives the signal STRB3. The signal STRB3 is also input to an OR gate 70, which is connected to the D terminal of the flip flop 78, which receives the clock signal.

The signals output from the latch 56 and the flip flop 76 are input to an exclusive OR gate 84. The output of the exclusive OR gate 84 is connected to the output of the latch 56 and to an input of a digital to analog converter 62. The digital to analog converter 62 is also connected to the flip flop 78 to receive the clock signal. The output signal MOD3 of the digital to analog converter 62 is input to the sensor 90.

The architecture of the system electronics used in the modulation scheme described above with reference to FIGS. 1 and 2 does not allow any changes to the sampling of the sensor output from the three τ times. However, the large sensor output signal changes during the inactive two τ times can be eliminated by inserting two τ/2 modulation cycles as illustrated in FIGS. 3 and 4. Electrical and/or optical cross coupling will be minimized because the large sensor output changes inherent in previous techniques are avoided. Instead, only short impulses occur which are decoupled in time from the sampling prints "S" and any residual cross coupling is minimized. The phase modulator of FIG. 3 is operated at three times the update rate. The long term settling phenomena is reduced, which results in improved system functionality and performance. Modulator stability over a shorter period of time is also improved.

The modulation scheme of FIGS. 3 and 4 adds modulation cycles to keep all the sensors 86, 88 and 90 active at all times. The feedback term still is only applied during the τ period where the sample is taken. In the two additional τ periods the feedback term is not applied. The sensors 86, 88 and 90 basically run open loop. An input rotation causes an uncompensated phase shift. This uncompensated phase shift produces the SensOut signal changes during the two open loop τ periods. Cross coupling can occur as before but now only for large input rotation levels. For small input rotations, where zero stability is of concern, the SensOut signal changes are small, and cross coupling is therefore negligible. For large input levels, cross coupling can be considered to affect misalignment and/or scale factor and in most cases also is negligible. Where cross coupling is not negligible, a further modification will eliminate the open loop τ periods and the SensOut large signal changes.

The same feedback term as applied in the sampled τ period can be applied also in addition to the modified modulation as described above. The dynamic range of the input rotation is generally limited to below 2000 Hz. Sampling is at a much higher rate and in most cases more than 100 times faster. A change of input rotation over a 3τperiod is small such that $$ROT(t)-(FB(t)-FB(T-TAU))=0 \quad (3)$$

is valid even if the feedback term is repeated three times without being updated. SensOut signal changes are minimized, if not avoided at all.

The three sensor outputs (SensOut 1, 2, 3) are summed at the output in node 93. The sensor outputs are enabled one at a time by digital controller 50 and sampled by the analog to digital converter 92 to generate the time multiplexed SENSOR DATA for the three sensors.

The M-bits of SENSOR DATA from the analog to digital converter 92 are received sequentially by the digital controller 50. The SENSOR DATA of each sensor 86, 88, 90 is processed to generate the feedback value which, added to the modulation value also generated in the digital controller 50, form the N-bits of CONTROL DATA for each sensor.

The CONTROL DATA is sequentially applied to the sensors 86, 88 and 90. For this purpose the corresponding CONTROL DATA is loaded into the digital to analog converters 58, 60 and 62 with the strobe signals STRB1, STRB2, STRB3 generated by the digital controller 50. Each output of the digital to analog converters 58, 60 and 62 produce modulator signals MOD1, MOD2 and MOD3, respectively. Each of the modulator signals MOD1, MOD2 and MOD3 drives the corresponding phase modulator of SENSOR1, SENSOR2 and SENSOR3.

The numbers of bits M and N required for SENSOR DATA and CONTROL DATA depend upon the sensor accuracy requirement. In this first implementation the number of SENSOR DATA bits are N=8 and the number of CONTROL DATA bits are M=12.

One problem is that sensors are modulated only every three τ with associated errors mentioned previously. Another problem is that the common bus driving the digital to analog converter inputs causes cross coupling via ADC bus feed between all three sensors, thereby catastrophically degrading sensor performance.

Double buffering of the CONTROL DATA bus eliminates bus feed in the digital to analog converters 58, 60 and 62, and, with the addition of minor logic, easily allows the additional modulation cycles to be inserted as described earlier.

The control data is sequentially loaded into the corresponding latch 52, 54 or 56 using the strobe signals STRB1, STRB2 or STRB3, which, in the same sequence, resets the corresponding flip flop 72, 74 or 76 to a zero output state. This sequencing assures that the exclusive OR gate 80, 82 or 84 is non-inverting at the time the CONTROL DATA is loaded into the corresponding latch. The output of the updated latch DATA1, DATA2 or DATA3 therefore first appears unmodified at the input of corresponding digital to analog converter 58, 60 or 62 when updated one clock cycle later. The bit below the Most Significant Bit (MSB) of the two unmodified latches outputs is toggled with every strobe signal STRB1, STRB2 and STRB3, which generates the additional modulation cycles as described earlier. This is accomplished by combining the appropriate strobe signals in OR gates 64, 66, 68 whose outputs clock the toggle flip flops 72, 74, 76. The outputs of the flip flops 72, 74, 76 are one input of the exclusive OR gates 80, 82, 84 to toggle the bit below the MSB of the corresponding digital to analog converter input data DATA1, DATA2, DATA3. Each digital to analog converter 58, 60 and 62 is updated every t by a strobe signal which is the combination of STRB1, STRB2, STRB3 and is resynchronized in flip flop 78 before being simultaneously applied to all three digital to analog converters 58, 60 and 62.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. Apparatus for modulating the phase of a triaxial fiber optic rotation sensor that includes three fiber optic rotation sensors arranged to sense rotations about three mutual perpendicular axes, comprising:

a digital controller apparatus arranged to produce control data signals to be applied to each of the three fiber optic rotation sensors and to produce strobe signals corresponding to each fiber optic rotation sensor;

signal combining apparatus connected to receive sensor signals output from the three fiber optic rotation sensors;

an analog to digital converter connected between the signal combining apparatus and the digital controller to sequentially input signals output from the three fiber optic rotation sensors to the digital controller;

apparatus for providing modulation cycles to keep all three fiber optic rotation sensors active simultaneously, comprising:

a first OR gate connected to the digital controller to receive the first and second strobe signals;

a second OR gate connected to the digital controller to receive the third strobe signal and connected to the output of the first OR gate;

a flip flop connected to receive the output of the second OR gate;

a clock signal input to the flip flop; and first, second and third digital to analog converters connected between corresponding fiber optic rotation sensors and the second OR gate, the digital controller sequentially supplying the first, second and third strobe signals, such that the first and second OR gates and the flip flop cooperate to provide simultaneous signals to each of the first, second and third digital to analog converters; and apparatus for sampling each sensor sequentially during a τ period;

apparatus for applying feedback modulation control data signals sequentially to the three sensors during the τ period for each sensor when the sensor was sampled; and apparatus for isolating feedback modulation control data signals from each fiber optic rotation sensor except for the τ periods in which it is sampled.

2. Apparatus for modulating the phase of a triaxial fiber optic rotation sensor that includes three fiber optic rotation sensors arranged to sense rotations about three mutual perpendicular axes, comprising:

a digital controller apparatus arranged to produce control data signals to be applied to each of the three fiber optic rotation sensors and to produce strobe signals corresponding to each fiber optic rotation sensor;

signal combining apparatus connected to receive sensor signals output from the three fiber optic rotation sensors;

an analog to digital converter connected between the signal combining apparatus and the digital controller to sequentially input signals output from the three fiber optic rotation sensors to the digital controller;

apparatus for providing modulation cycles to keep all three fiber optic rotation sensors active simultaneously;

apparatus for sampling each sensor sequentially during a τ period; apparatus for applying feedback modulation control data signals sequentially to the three sensors during the τ period for each sensor when the sensor was sampled, comprising:

a latch having a first input terminal connected to the digital controller to receive the modulation data signals and having a second input terminal connected to the digital controller to receive a selected one of the strobe signals such that the latch output is the modulation data signals when the selected strobe signal is applied to the latch;

an OR gate connected to receive the other two strobe signals as inputs;

a flip flop having its clock terminal connected to the output of the OR gate so that control data is sequentially loaded into the latch using the selected strobe signal, which, in the same sequence, resets the corresponding flip flop to a zero output state; and an exclusive OR gate connected to receive inputs from the latch and from the flip flop so that the exclusive OR gate is non-inverting when the control data is loaded into the corresponding latch and so that the latch appears unmodified at the input of corresponding digital to analog converter when updated one clock cycle later; and apparatus for isolating feedback modulation control data signals from each fiber optic rotation sensor except for the τ periods in which it is sampled.

3. The apparatus of claim 2, further including apparatus for toggling the bit below the Most Significant Bit (MSB) of the two unmodified latch outputs with a plurality of strobe signals STRB1, STRB2 and STRB3, to generate modulation cycles that are applied to the fiber optic rotation sensor.

4. The apparatus of claim 2, further including:

a plurality of OR gates arranged to provide output signals that clock a corresponding plurality of toggle flip flops:

a plurality of exclusive OR gates having inputs connected to the outputs of the corresponding flip flops to toggle the bit below the MSB of the corresponding digital to analog converter input data; and a resynchronizing flip flop connected to each digital to analog converter to provide an update signal every τ time by a combination of the three strobe signals that is simultaneously applied to all three digital to analog converters.

5. A method for modulating the phase of a triaxial fiber optic rotation sensor that includes three fiber optic rotation sensors arranged to sense rotations about three mutual perpendicular axes, comprising the steps of:

arranging a digital controller apparatus to produce control data signals to be applied to each of the three fiber optic rotation sensors and to produce strobe signals corresponding to each fiber optic rotation sensor;

connecting signal combining apparatus to receive sensor signals output from the three fiber optic rotation sensors;

connecting an analog to digital converter between the signal combining apparatus and the digital controller to sequentially input signals output from the three fiber optic rotation sensors to the digital controller;

providing modulation cycles to keep all three fiber optic rotation sensors active simultaneously by a method that includes the steps of;

connecting a first OR gate to the digital controller to receive the first and second strobe signals;

connecting a second OR gate to the digital controller to receive the third strobe signal and to the output of the first OR gate;

connecting a flip flop to receive the output of the second OR gate;

providing a clock signal input to the flip flop; and connecting first, second and third digital to analog converters between corresponding fiber optic rotation sensors and the second OR gate, the digital controller sequentially supplying the first, second and third strobe signals such that the first and second OR gates and the flip flop cooperate to provide simultaneous signals to each of the first, second and third digital to analog converters;

sampling each sensor sequentially during a τ period;

applying feedback modulation control data signals sequentially to the three sensors during the τ period for each sensor when the sensor was sampled; and isolating feedback modulation control data signals from each fiber optic rotation sensor except for the τ periods in which it is sampled.

6. A method for modulating the phase of a triaxial fiber optic rotation sensor that includes three fiber optic rotation sensors arranged to sense rotations about three mutual perpendicular axes, comprising the steps of:

arranging a digital controller apparatus to produce control data signals to be applied to each of the three fiber optic rotation sensors and to produce strobe signals corresponding to each fiber optic rotation sensor;

connecting signal combining apparatus to receive sensor signals output from the three fiber optic rotation sensors;

connecting an analog to digital converter between the signal combining apparatus and the digital controller to sequentially input signals output from the three fiber optic rotation sensors to the digital controller;

providing modulation cycles to keep all three fiber optic rotation sensors active simultaneously;

sampling each sensor sequentially during a τ period;

applying feedback modulation control data signals sequentially to the three sensors during the τ period for each sensor when the sensor was sampled by a method comprising the steps of:

connecting a latch having a first input terminal to the digital controller to receive the modulation data signals and having a second input terminal connected to the digital controller to receive a selected one of the strobe signals such that the latch output is the modulation data signals when the selected strobe signal is applied to the latch;

connecting an OR gate to receive the other two strobe signals as inputs;

connecting a flip flop to the output of the OR gate so that control data is sequentially loaded into the latch using the selected strobe signal, which, in the same sequence, resets the corresponding flip flop to a zero output state; and connecting an exclusive OR gate to receive inputs from the latch and from the flip flop so that the exclusive OR gate is non-inverting when the control data is loaded into the corresponding latch and so that the latch appears unmodified at the input of corresponding digital to analog converter when updated one clock cycle later; and isolating feedback modulation control data signals from each fiber optic rotation sensor except for the $\tau$ periods in which it is sampled.

7. The method of claim 6, further including the step of toggling the bit below the Most Significant Bit (MSB) of the two unmodified latch outputs with a plurality of strobe signals STRB1, STRB2 and STRB3, to generate modulation cycles that are applied to the fiber optic rotation sensor.

8. The method of claim 6, further including the steps of:

arranging a plurality of OR gates to provide output signals that clock a corresponding plurality of toggle flip flops:

connecting a plurality of exclusive OR gates having inputs to the outputs of the corresponding flip flops to toggle the bit below the MSB of the corresponding digital to analog converter input data; and connecting a resynchronizing flip flop to each digital to analog converter to provide an update signal every $\tau$ time by a combination of the three strobe signals that is simultaneously applied to all three digital to analog converters.

* * * * *